United States Patent [19]

Weston

[11] Patent Number: 4,896,902
[45] Date of Patent: Jan. 30, 1990

[54] SEGMENTED TRANSITION COUPLING

[75] Inventor: Richard R. Weston, Nazareth, Pa.

[73] Assignee: Victaulic Company of America, Easton, Pa.

[21] Appl. No.: 251,590

[22] Filed: Sep. 29, 1988

[51] Int. Cl.[4] .............................................. F16L 17/00
[52] U.S. Cl. ..................................... 285/93; 285/112; 285/367; 285/373; 285/420
[58] Field of Search .................. 285/112, 27, 93, 367, 285/373, 410, 366, 420; 24/279, 284, 19, 459

[56] References Cited

U.S. PATENT DOCUMENTS

| | | | |
|---|---|---|---|
| 863,887 | 8/1907 | Stuttle | 285/420 |
| 3,054,629 | 9/1962 | Piatek | 285/373 |
| 3,476,410 | 11/1969 | Pastva, Jr. | 285/112 |
| 3,664,691 | 5/1972 | Nakamura | 285/910 |
| 3,695,638 | 10/1972 | Blakeley | 285/373 |
| 4,373,235 | 2/1983 | Korgaonkar | 285/112 |
| 4,438,960 | 3/1984 | Carroll et al. | 285/367 |
| 4,611,839 | 9/1986 | Rung et al. | 285/367 |

Primary Examiner—Thomas F. Callaghan
Assistant Examiner—Anthony Knight
Attorney, Agent, or Firm—Abelman, Frayne Rezac & Schwab

[57] ABSTRACT

Coupling segments of a segmented pipe coupling have dissimilar ends that are interfittable with ends of an identical said coupling segment in only one specific orientation of said coupling segments, and which are antagonistic to the interfitting of said ends of said coupling segments in all other positions of orientation of said coupling segments.

4 Claims, 5 Drawing Sheets

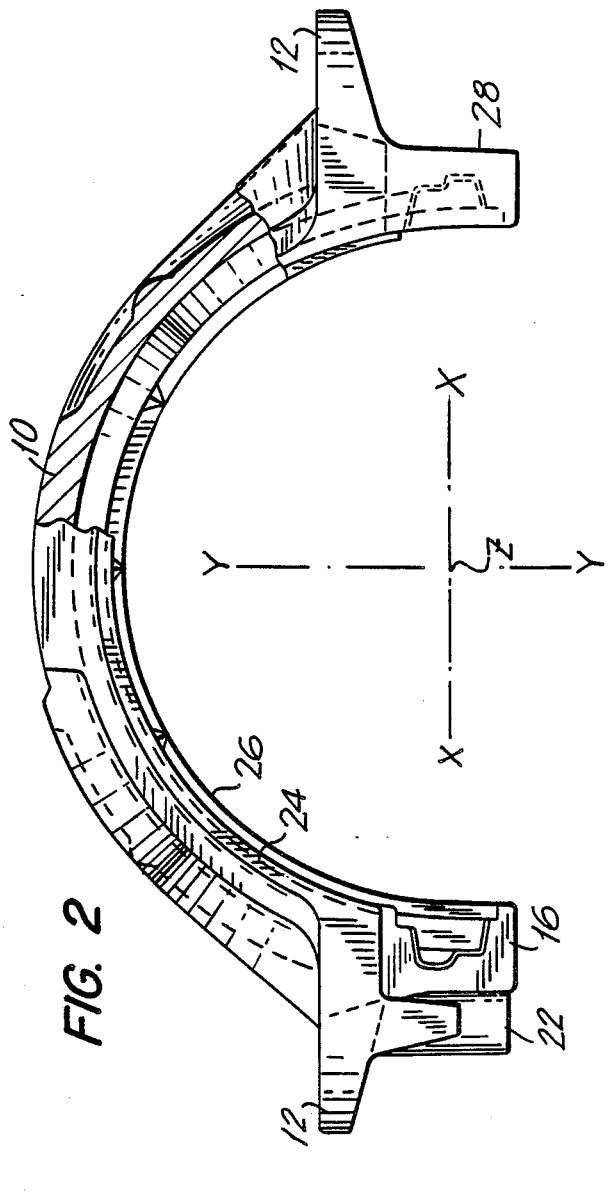
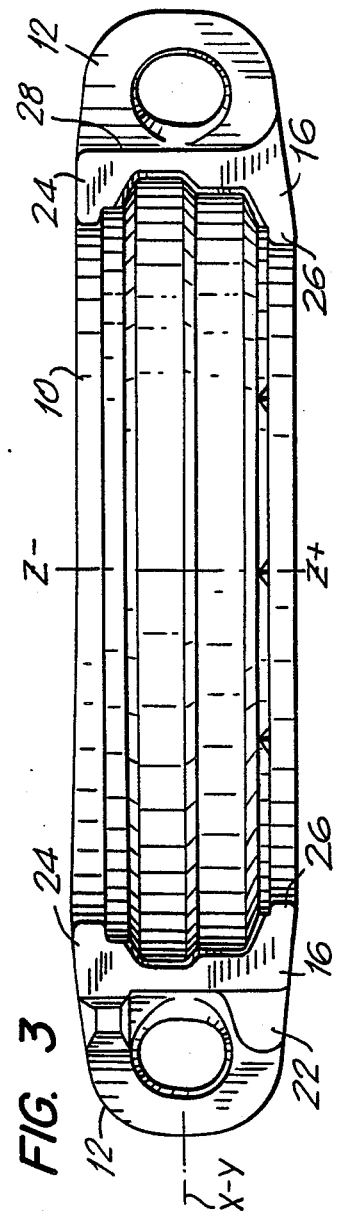
FIG. 2
FIG. 3

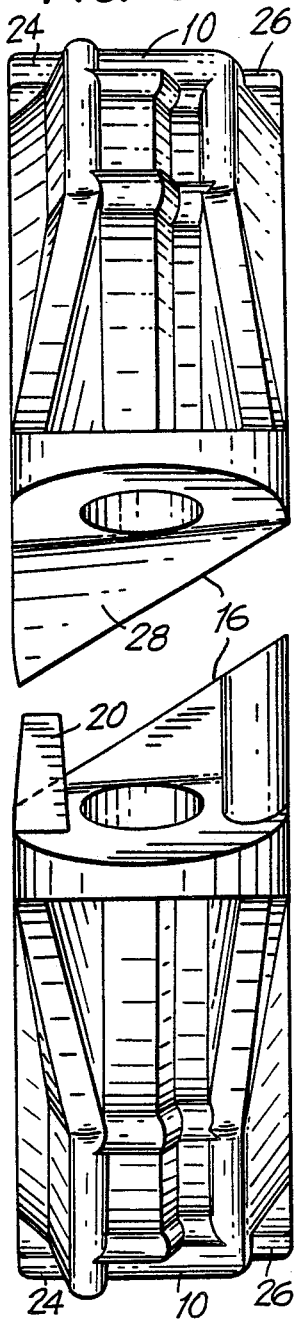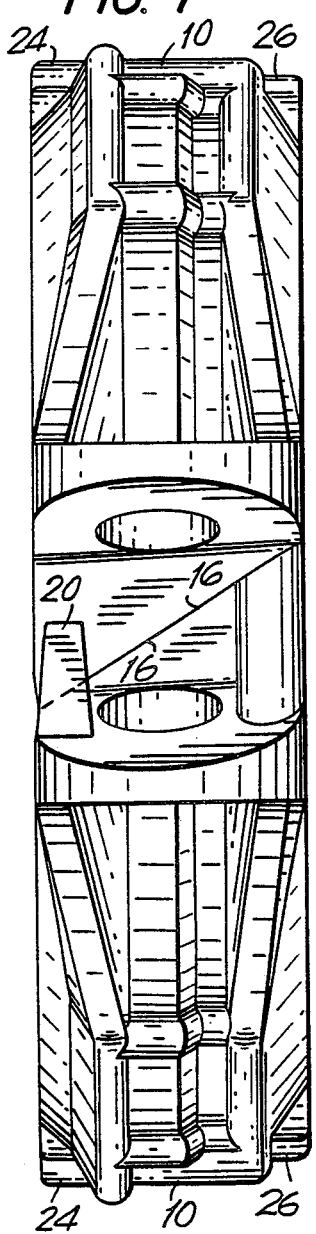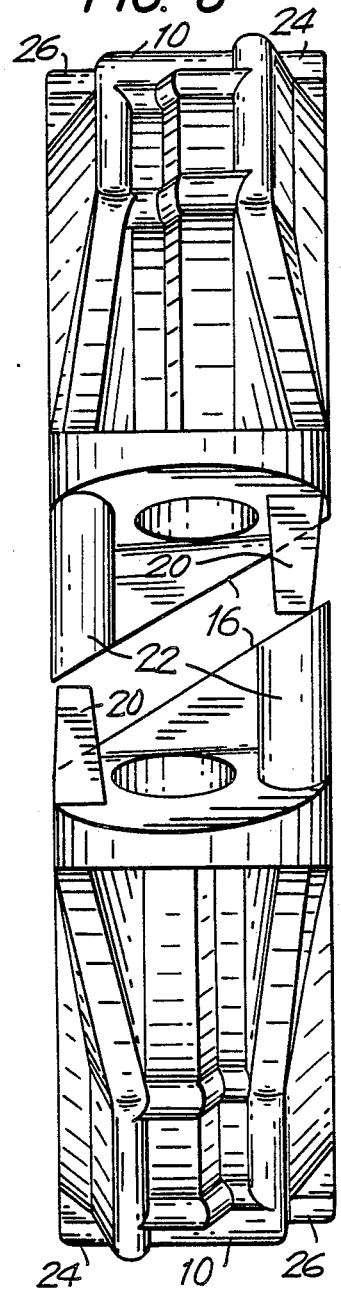

SEGMENTED TRANSITION COUPLING

FIELD OF THE INVENTION

This invention relates to a segmented coupling for use in connecting two pipes of different external diameters to each other in sealed relationship, and in particular relates to a segmented coupling for use in connecting a cast iron pipe of one external diameter to a drawn steel pipe of an different external diameter, albeit that both have the same nominal internal diameter.

BACKGROUND OF THE INVENTION

Segmented couplings for pipes are well known in the art, and comprise two or more coupling segments each having a recess for the reception of a sealing gasket adapted to extend over the adjacent ends of a pair of pipes, and which is to be compressed by the coupling segments into sealing relation with the external peripheries of the respective pipes.

Each coupling segment has radially inwardly extending keys at its opposite axial sides, the keys being for reception in grooves in the respective pipe ends to perform the required mechanical interconnection between the pipes.

The coupling segments are drawn towards each other by traction bolts which extend through radially outwardly extending bolting pads at the respective opposite ends of the coupling segments. In this manner, the end faces of the coupling segments are drawn towards each other for them to clamp onto each other in the case of a "flexible" coupling, or, for the coupling segments to clamp directly onto the pipe exterior in the case of a "rigid" coupling. It is explained that a "flexible" coupling is one which will permit relative movement of the pipes to limited extents and the angling of the axis of one of the pipes relative to the other, whereas a "rigid" coupling is one which will immobilize the pipes against any such movements.

Typical of such couplings are the ones shown in Nakamura U.S. Pat. No. 3,664,691, in Piatek U.S. Pat. No. 3,054,629, and Blakely U.S. Pat. No. 3,695,638, each of which teach coupling segments having end faces that extend parallel to the X-Z plane of the coupling, i.e., parallel to the longitudinal axis of the respective pipes.

Such couplings readily can be provided in "flexible" form. However, unless the end faces of the coupling segments ultimately remain spaced from each other, no guarantee can be made that the coupling is a truly "rigid" coupling, in that the pipes themselves will vary in external diameter within the permitted range of manufacturing tolerances of such pipes. If the end faces of the coupling segments remain spaced from each other, then, there is the necessity of providing extrusion shields spanning the gaps between the mutually presented end faces in order to prevent gasket extrusion under high internal pressures.

More recent developments in "rigid" couplings are shown in Rung et al. U.S. Pat. No. 4,611,839, which teaches a segmented coupling that is truly "rigid" despite variations in the pipe diameters within the accepted range of manufacturing tolerance of the pipes. This is accomplished by arranging for the end faces of the coupling segments to be inclined at angles relative to the X-Z plane of the coupling, the inclination of the end faces either being in the same direction relative to the X-Z plane of the coupling as shown in FIG. 9 of the patent, or, being in opposite directions relative to the X-Z plane of the coupling as shown in FIG. 12 of this patent.

In the event that the coupling faces are inclined in the same direction, while the coupling segments maY be identical with each other, they are not symmetrical, i.e., they can onlY be assembled one to the other in one position of the coupling segments.

However, if the end faces of the coupling segments are oppositely inclined relative to each other, then, coupling segments are provided which not only are identical one with the other, but which are also truly symmetrical one with the other, i.e., one of the coupling segments can be assembled to the other in a first position, and equally well can be rotated 180 degrees about the Y axis of the coupling and also correctly assembled to the other coupling segment.

Thus, in coupling segments of the type in which the end faces of the coupling segments extend parallel to the X-Z plane of the coupling for the coupling segments to be both identical and symmetrical, and in the FIG. 12 embodiment of the Rung et al. patent in which the end faces of the coupling segments are inclined relative to the X-Z plane of the coupling, but in opposite directions, there exists the possibility of assembling one of the coupling segments to the other either in the first position, or in a position rotated 180 degrees about the Y axis of the coupling.

This poses no particular problems in the case that both pipes are of the same external diameter. It can, however, result in disastrous consequences in the event that the external diameter of one of the pipes is different from the external diameter of the other pipe by an amount greater than the permissible range of manufacturing tolerances of either one of the pipes.

Young, U.S. Pat. No. 3,680,894 is specifically directed to a segmented coupling for use with pipes of external diameters different from each other, the coupling segments of this patent also having end faces which extend parallel to the X-Z plane of the coupling. Young's coupling is, however, intended for use on pipes of different internal diameters, and thus of appreciably different external diameters, in view of which the possibility of mis-assembly of the coupling segments onto the pipes with one of the coupling segments in a reversed condition will be readily apparent to the workman assembling the coupling. In fact, the coupling will not assemble, in that the internal diameter of the coupling segment intended for the smaller diameter pipe will not pass over the larger external diameter of the larger pipe.

If, however, a Young-type coupling is employed for joining two pipes of only slightly different external diameters, as in the case of joining cast iron pipe to drawn steel pipe of the same nominal size, then, a Young coupling could be inadvertently misassembled onto the pipes.

Through inadvertence, it is quite possible for a workman to assemble one of the coupling segments with its correct internal diameters presented to the pipes, and then to present the other coupling segment to the pipes in a reversed condition with its smaller internal diameter intended for presentation to the smaller external diameter of the steel pipe actually presented to the larger external diameter of the cast iron pipe, and, with the larger internal diameter of the coupling segment intended for the cast iron pipe presented to the smaller external diameter of the steel pipe. This can readily happen in that the difference in external diameter of the respective pipes is quite small. Further, during the assembly of the coupling the keys of the respective coupling segments are at that time concealed within the grooves of the respective pipes, and can not be visually observed, this removing a possible indication to the workman that the coupling has been incorrectly assembled.

If now the workman completes the assembly of the joint with the coupling segments improperly positioned, this may result in a defective joint, in that the sealing gasket will be improperly compressed into engagement with the external peripheries of the pipes. This can be of disastrous consequences in the event that the pipes are intended for the handling of high internal pressure, or, for the handling of noxious gases or highly flammable liquids.

SUMMARY OF THE INVENTION

It is an object of this invention to provide a segmented coupling for pipes of different external diameters in which a clear indication is given to the workman in the event that one of the coupling segments has been reversed, and, which in fact makes it impossible to effect any semblance of correct installation of the coupling if one of the coupling segments has been reversed.

In this manner, a clear visual and tactile indication of incorrect assembly of the coupling is provided to the workman in the event that one of the coupling segments has been incorrectly assembled to the other.

According to the present invention, the respective coupling segments intentionally are formed identical with each other for any specific sizes of pipe. While the coupling segments intentionally are formed identical with each other, they are also intentionally formed at their respective ends for them to be assymetrical to an extent that the coupling segments can only be assembled to each other in one specific orientation of the coupling segments. If one of the coupling segments is reversed relative to the other, then, the respective ends of the coupling segments will not interfit, thus preventing final assemblY of the coupling segments in that incorrect orientation, and providing a visual and tactile indication to a workman that the coupling has been incorrectly assembled.

Thus, as there is only one possible waY of properly assembling the coupling segments to each other, the problem of inadvertent misassembly of a coupling employed to effect a transition between cast iron pipe and steel pipe of the same internal diameters is eliminated in its entirety.

This is accomplished by providing a formation on one end of each coupling segment which will interfit with the other end of another coupling segment, but, which will not interfit with the said one end of the other coupling segment.

The formation can be of any shape that will prevent improper assembly of the coupling segments. In a preferred embodiment of the invention it is provided by a tooth positioned at one end of the coupling segment, and which extends beyond the end face of the coupling segment at that end. The tooth is positioned adjacent one axial side of the coupling segment, and, at the other axial side of the coupling segment at that end, the coupling segment is formed to provide an abutment.

In a correct assembly of the coupling segments, the tooth extends freely over the adjacent end of the other coupling segment. If, however, the coupling segments are incorrectly assembled to each other, then, the tooth provided on each of the coupling segments will engage with the abutment provided on the said one end of the other coupling segment, and, will prevent the coupling segments from being assembled to each other at those ends of the coupling segments.

Thus, the very large gap between those ends of the coupling segments provides a clear indication to the workmen that the coupling segments have been incorrectly assembled one to the other, it merely being necessary to reverse one of the coupling segments to provide the correct assembly.

There is, of course, still the possibility that the workmen will reposition the incorrect one of the coupling segments, such that the smaller diameter side of the coupling intended for the smaller diameter pipe is presented to the larger external diameter of the cast iron pipe, and the larger diameter side of the coupling intended for the cast iron pipe is presented to the smaller diameter of the steel pipe.

If this does occur, then, closure of the coupling will be prevented by the larger diameter of the contained sealing gasket, and also, the coupling segments will angle themselves relative to the X-Y plane, again providing an indication of incorrect assembly.

While the configuration of the preferred embodiment will only prevent closure of the coupling at one side of the coupling, other configurations of the coupling segments can provide a restraint against closure of the coupling segments at both of the ends thereof, particularly in coupling segments having end faces which extend parallel to the X-Z plane of the coupling..

DESCRIPTION OF THE DRAWINGS

Preferred embodiments of the present invention will now be discussed with reference to the accompanying drawings, in which:

FIGS. 2 and 3 are a front elevation and an underside plan view of one of the coupling segments of FIG. 1;

FIG. 6 is a side view of two coupling segments of the invention in the process of being moved towards each other in a correct orientation of the coupling segments;

FIG. 7 is a view corresponding with FIG. 6, and showing the coupling segments in their final position of assembly;

FIG. 8 is a side view similar to FIGS. 6 and 7, but showing identical coupling segments incorrectly assembled one to the other; and, FIG 9 is a fragmentary perspective view of an alternative formation of one end of the coupling segment of FIG. 4.

DESCRIPTION OF THE PREFERRED EMBODIMENTS

Figure 1:
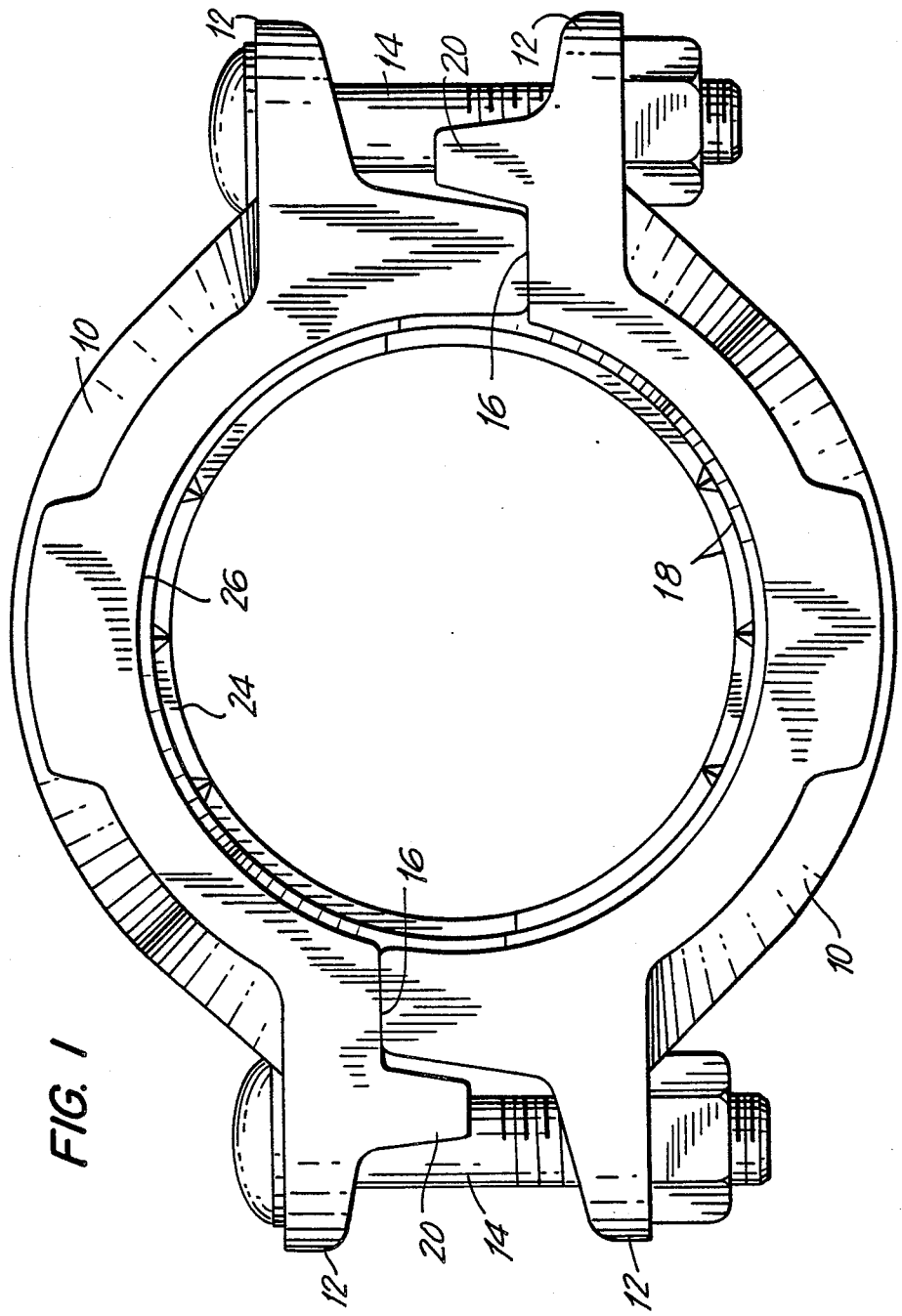
FIG. 1 is a front elevation of a preferred embodiment of segmented coupling according to the present invention.

Referring firstly to FIG. 1, there is shown a pipe coupling comprised of two identical coupling segments 10. Such a coupling primarily is intended for use on relatively small diameter pipes, for example, of 9" diameter or less. For larger sizes of pipe, then, three or more appropriately and identically configured coupling segments can be employed.

Each coupling segment has oppositely extending bolting pads 12, the respective coupling segments being secured to each other by traction bolts 14, which act to draw end faces 16 at opposite ends of the respective coupling segments into engagement with each other.

The respective coupling segments are provided with keys 18 at their respective axially opposite faces for reception in grooves formed in the respective outer peripheries of the pipes [not shown] to be joined by the coupling.

As is well known in the art, the coupling segments contain and encircle a sealing gasket [not shown] which spans the ends of the pipes in sealing relationship, and which is compressed into engagement with the pipes as the coupling is tightened down.

Figure 4:
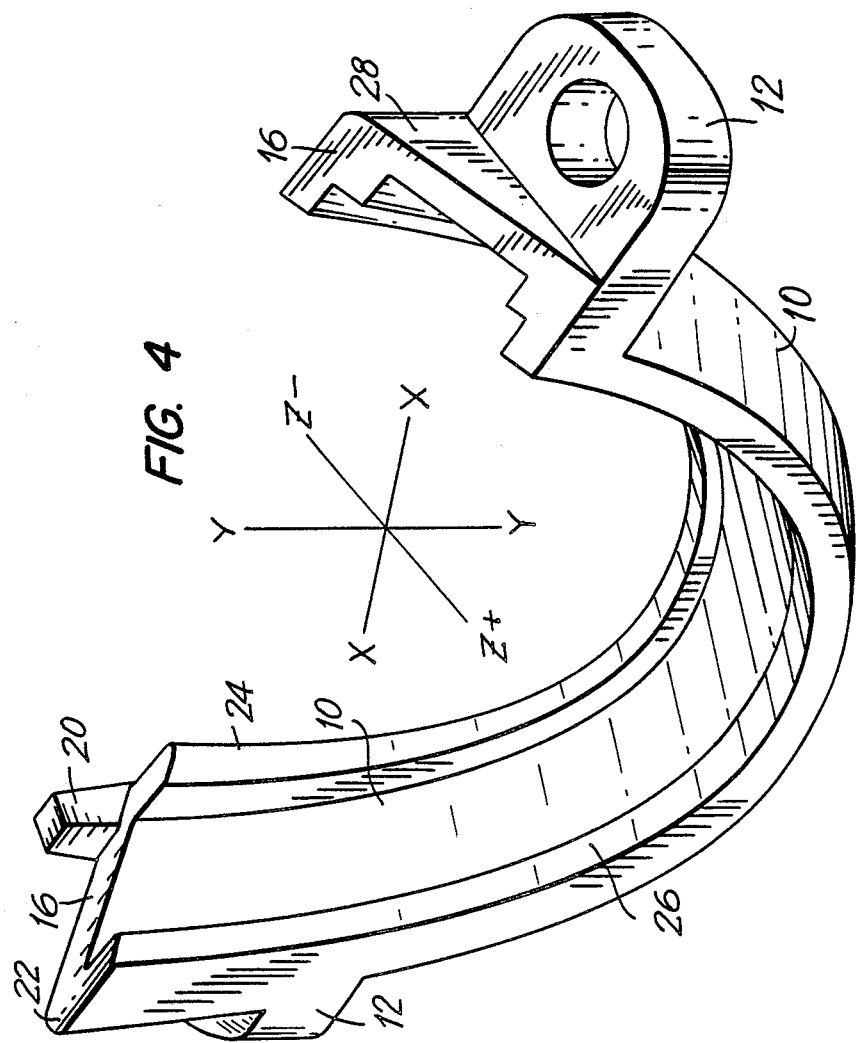
FIGS. 4 and 5 are perspective views of the preferred embodiment of the present invention from opposite sides.
Figure 5:
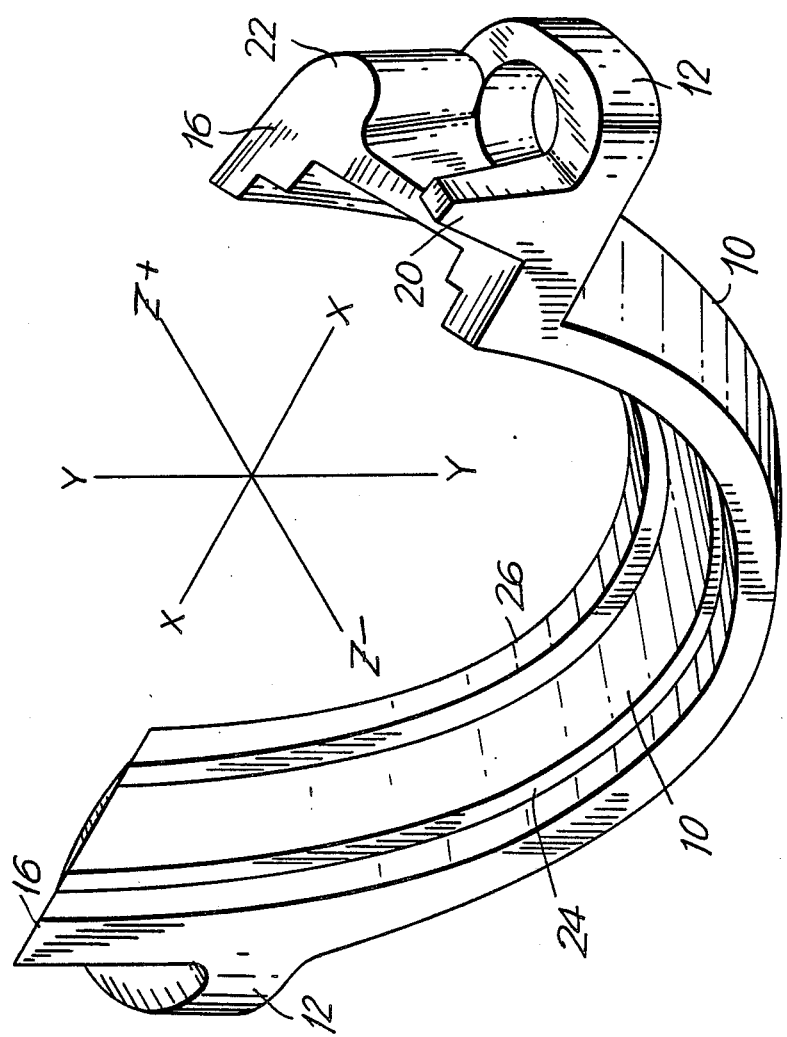

Referring now to FIGS. 2 and 3, which show the front and underside of one of the coupling segments, and to FIGS. 4 and 5 which show opposite sides of the coupling segment, each coupling segment includes a tooth 20 formed integrally with the bolting pad 12 at one end of the coupling segment, that end of the coupling segment also being formed to provide an abutment 22, also formed integrally with the bolting pad at that end of the coupling. The tooth 20 and abutment 22 each are positioned radially outwardly of the end face 16 at the opposite end of the coupling segment, the tooth 20 extending perpendicularly beyond its adjacent end face 16.

Referring now to FIG. 6, it will be seen that one axial end 24 of each coupling segment is formed of slightly larger diameter than the other axial end 26, this being to accommodate a cast iron pipe in the larger diameter end 24, and to accommodate a steel pipe in the smaller diameter end 26.

If now two of the coupling segments are presented to each other in correct orientation, then, the tooth 20 of each of the respective coupling segments is positioned for it to move over a planar side surface 28 of the other coupling segment, for the respective coupling segments then to move into the position shown in FIG. 7.

As will be observed, the respective end faces 16, as taught in Rung et al., U.S. Pat. No. 4,611,839, are inclined oppositely to each other in the X-Z plane of the coupling, in order that the respective coupling segments can move relative to each other in opposite directions during tightening down of the coupling for the coupling segments to clamp onto the pipes to be secured. Such relative movement is permitted in that the tooth 20 is spaced from and free to move relative to the adjacent planar face 28 of the opposed coupling segment without hindrance.

Referring now to FIG. 8, it will be seen that the top coupling segment 10 has been rotated 180° about the Y axis and is incorrectly presented to the bottom coupling segment. This has caused the larger and smaller diameters 24 and 26 of the top coupling segment to be reversed, and has resulted in the tooth 20 and the abutment 22 of both of the coupling segments to be positioned at the same side of the coupling.

In this position, tightening down of the coupling is prevented at one side of the coupling, the tooth 20 of the lower coupling segment at that time being in engagement with the abutment 22 of the upper coupling segment, and similarly, the tooth 20 of the upper coupling segment being in engagement with the abutment 22 of the lower coupling segment.

Thus, a clear indication is given to the workman that the coupling has been improperly assembled in that it will not close at one end, and, that the coupling segments must be correctly re-assembled before the coupling can be tightened down by means of the traction bolts.

This spacing of the end faces will occur at one side only of the coupling, the end faces at the opposite side of the coupling being free to engage one another. It is, however, more than sufficient to provide a visual and tactile indication to the workman that tightening down of the coupling can not be effected and that the coupling has been improperly assembled from the coupling segments. Additionally, the coupling will be incapable of clamping down onto the pipes, and as a consequence, will be freely rotatable about the pipe against the frictional restraint of the contained gasket.

In this manner, it is assured that a coupling will be assembled correctly with its smaller internal diameter presented to the smaller pipe, and, its larger internal diameter presented to the larger pipe, as is essential in order to provide for correct compression of the contained sealing gasket and mechanical retention of the pipes through complete circumferential engagement of the coupling keys with the pipe grooves.

As will be appreciated, while the invention has been described in conjunction with coupling segments having inclined end faces, it has equal applicability to conventional coupling segments in which the end faces extend parallel to the X-Z plane of the coupling.

Figure 9:
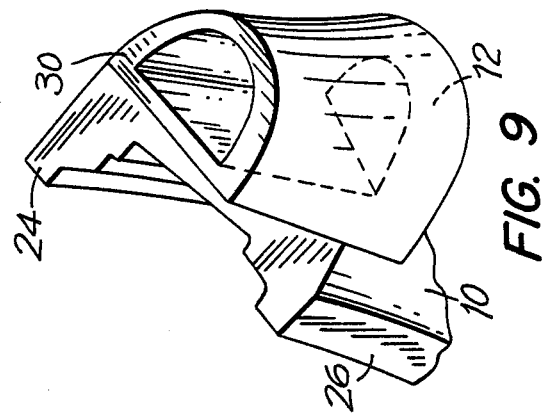

Also, any other form of stop members and abutments can be employed, provided that they interfit with the other coupling segment when the coupling segments are properly presented to each other, and engage each other when the coupling segments are incorrectly presented to each other. For example, they could be provided by a continuous shroud 30 extending around the bolting pad 12 at one end of the coupling segment, as illustrated in FIG. 9.

While the coupling has been described in relation to a transition coupling for use with pipe of identical internal diameters, but of different diameters, it will be appreciated that the invention has application in any circumstances in which it is mandated that the coupling segments be assemblable in only one orientation, for example, in the event that the contained gasket is assymetrical in cross section, or, the pipes are of different materials but of identical external diameter the difference being in the depth of the groove, or, the end formation of one pipe differs from the end formation of the other, such as one of the pipes being grooved and the other being a thin walled beaded pipe.

I claim:

1. A coupling segment for use in conjunction with an identical coupling segment to provide a transitional segmented pipe coupling;

said coupling segment having end faces respectively inclined oppositely relative to an X-Z plane of said coupling segment; and, means at one end only of said coupling segment prohibiting assembly of said one end of said coupling segment to a said one end of an identical coupling segment; said means comprising an abutment integral with said one end of said coupling segment and positioned adjacent one axial side of said coupling segment, and a projection integral with said one end of said coupling segment and positioned adjacent an opposite axial side of said coupling segment;

said abutment and said projection each being positioned radially outwardly of the associated said end face;

said projection extending perpendicularly above the adjacent surface of said end face in a direction tangential to said coupling segment;

said projection being freely moveable relative to an opposite end of an identical said coupling segment to permit both axial movement of said one end in the direction of the X-X axis of said coupling segment, and also to permit rotational movement of said coupling segment about the Y-Y axis of said coupling segment.

2. The coupling segment of claim 1, in which said abutment and said projection are portions of a member extending between the opposite axial sides of said coupling segment and positioned radially outwardly of the associated said end face.

3. The coupling segment of claim 1, further including keys at opposite axial sides of said coupling segment, said keys being of an internal diameter different from each other and being for engagement in grooves of different diameters formed externally in pipes.

4. The coupling segment of claim 1, in combination with at least one identical coupling segment to provide a transitional segmented pipe coupling, said pipe coupling being assemblable in only one specific orientation with a said one end of one of said coupling segments presented to a said opposite end of an identical said coupling segment, said one ends of said respective coupling segments being antagonistic to interfitting relative to each other, and, traction means on said respective coupling segments operative to urge mutually presented end faces of said coupling segments towards each other.

* * * * *